US006517086B1

(12) United States Patent
Jamrog

(10) Patent No.: US 6,517,086 B1
(45) Date of Patent: Feb. 11, 2003

(54) EXHAUST PIPE GASKET

(75) Inventor: James I. Jamrog, Livonia, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/863,675

(22) Filed: May 23, 2001

(51) Int. Cl.$^7$ .......................... F16L 17/06; F16L 15/02
(52) U.S. Cl. ................... 277/610; 277/602; 277/608; 277/627; 277/633; 277/644; 277/653; 277/654
(58) Field of Search ............................... 277/602, 603, 277/608, 610, 627, 628, 633, 644, 653, 654

(56) References Cited

U.S. PATENT DOCUMENTS

| | | | | |
|---|---|---|---|---|
| 1,838,496 A | * | 12/1931 | Oven | 277/592 |
| 2,580,546 A | * | 1/1952 | Hobson | 277/652 |
| 3,132,870 A | | 5/1964 | Pschera | |
| 4,189,819 A | | 2/1980 | Nicholson | |
| 4,361,355 A | * | 11/1982 | Wise et al. | 232/15 |
| 4,673,187 A | * | 6/1987 | Hanson et al. | 277/314 |
| 5,269,540 A | | 12/1993 | Nobuchi et al. | |
| 5,308,090 A | * | 5/1994 | Hamada et al. | 277/609 |
| 5,511,797 A | | 4/1996 | Nikirk et al. | |
| 5,622,372 A | * | 4/1997 | Fujisawa et al. | 277/627 |
| 6,055,806 A | * | 5/2000 | Dalton | 123/193.5 |

* cited by examiner

Primary Examiner—Anthony Knight
Assistant Examiner—E. Peavey
(74) Attorney, Agent, or Firm—Rader, Fishman & Grauer, PLLC

(57) ABSTRACT

A spiral-wound gasket includes a plurality of tightly wound metal windings to form a core. The windings each have a Chervon cross-section, wherein V-notched undulations of each winding registers with an adjacent winding at said notches. The edges of the windings are welded to form a pre-assembled integral composite that is installed into a J-shaped outer wrap or cover. Finally, the cover is closed about the core so as to entirely cover and encapsulate the core. In a preferred form, both the core and outer cover are formed of stainless steel materials.

11 Claims, 2 Drawing Sheets

EXHAUST PIPE GASKET

BACKGROUND OF THE INVENTION

1. Field of Invention

This invention relates to gaskets employed in vehicles, and particularly to metallic gaskets employed in manifold exhaust systems of vehicles.

2. Description of the Prior Art

Exhaust manifolds used in automotive vehicles are subject to great variations in temperature, as well as to extreme mechanical vibrations. As such, the gaskets associated with exhaust manifolds and vehicle exhaust systems are known to present difficult sealing challenges. Gaskets interposed between exhaust connection parts are required to maintain resilient sealing properties over extended periods of time, and have an accompanying risk of exposing vehicular occupants to carbon monoxide poisoning if such gasket seals are inadequate.

Choices of gasket materials used under such severe conditions include metal-covered gaskets with soft core members such as heat resistant fibers including asbestos and ceramic fibers. More recently the use of expanded graphite and/or mica covered by a metallic sheet has been popular. Such metal-covered gaskets have provided relatively soft core members that offer excellent heat resistance, while the metallic coverings offer rigidity. However, such gaskets have been subject to reduction of contact pressure between connected parts over a period of time, along with deterioration of sealing properties under conditions of cyclic thermal expansion and vibrations, and thus recovery properties of such composite material bodies have not held up over time. In addition, graphite fillers used in such gaskets have been subject to severe oxidation, which compromises integrity of the gasket structures.

Spiral-wound gaskets have been offered to overcome issues of resiliency, hence recovery, as well as oxidation. However, most such spiral-wound gaskets have been formed of complex structures, which are expensive to manufacture. As a result, such gaskets have not been feasible for many applications.

SUMMARY OF THE INVENTION

The present invention provides a new improved gasket assembly that is simpler in construction, and relatively less expensive to manufacture than spiral-wound gaskets of the prior art. The improved gasket of this invention employs a spiral-wound plurality of tightly bound-together windings comprising a core or filler portion. The core windings present a Chevron cross-section, intermittently spot welded along its inside and outside circumferential diameters to define an integral pre-formed circular hoop. In a preferred embodiment, the core is formed of a stainless steel material. The core is covered by an outer circumferential metal wrap that is somewhat softer than the resilient, springy metal material of the core. In its preferred form, the outer wrap also comprises a metal of stainless steel, and entirely covers the exterior surfaces of the core to avoid oxidation.

DETAILED DESCRIPTION OF PREFERRED EMBODIMENTS

Figure 1:
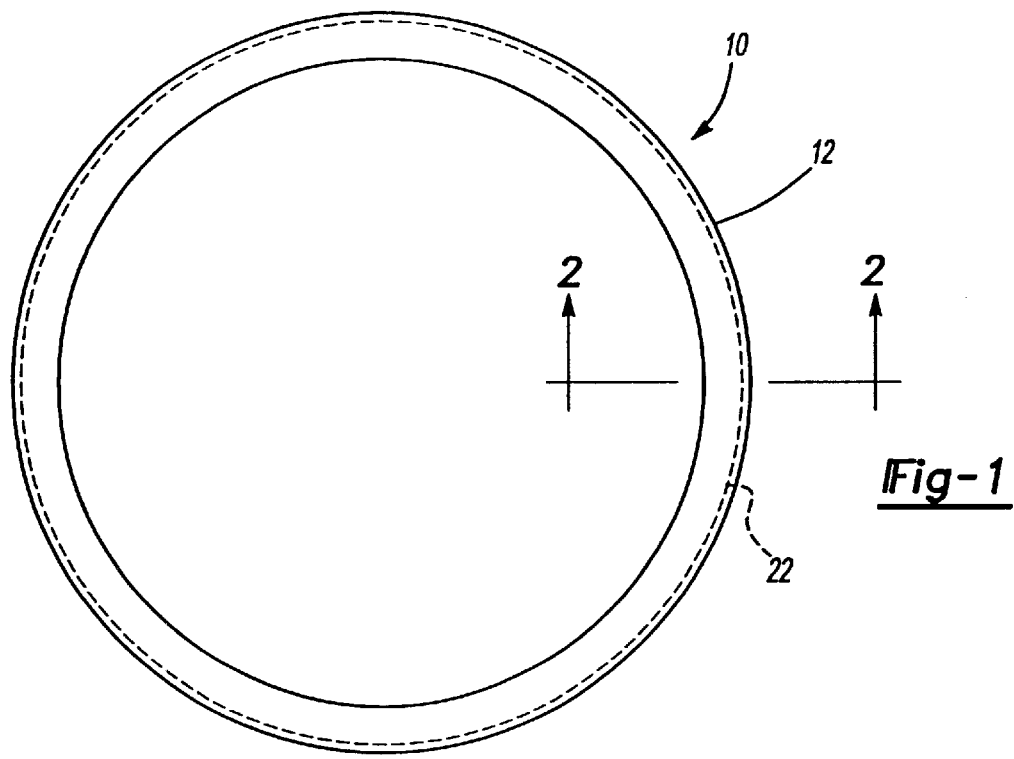
FIG. 1 is a plan view of a spiral-wound gasket constructed in accordance with a preferred embodiment of the present invention.
Figure 2:
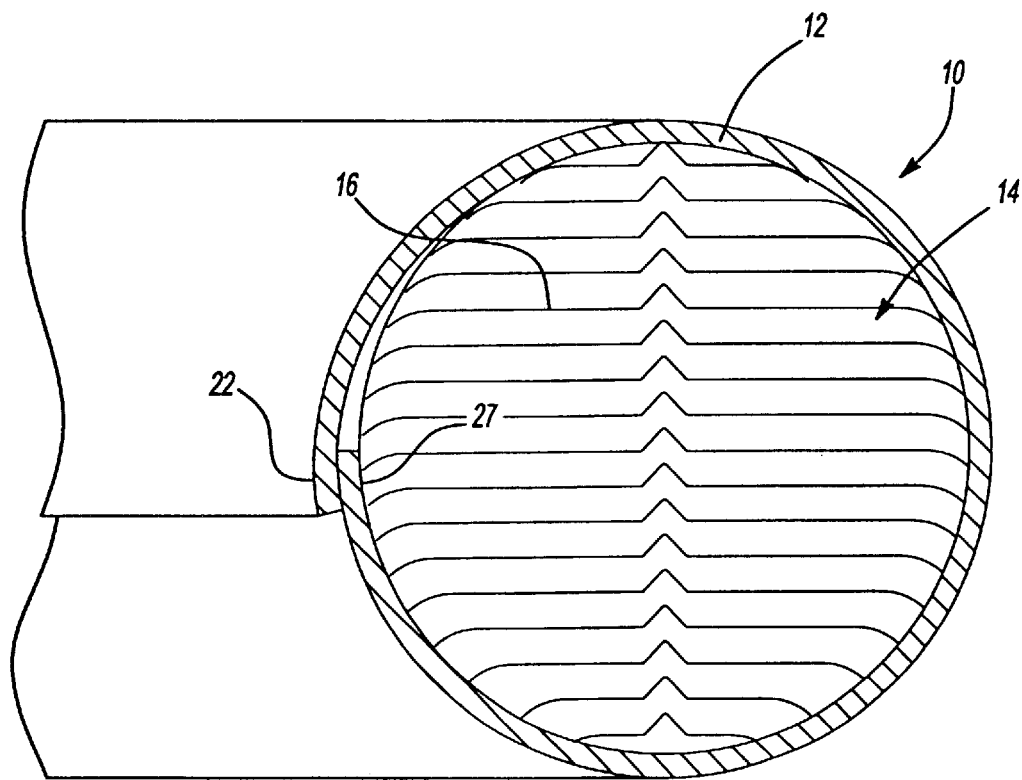
FIG. 2 is a view along lines 2—2 of FIG. 1, depicting the Chevron-shaped cross-section of the spiral-wound gasket.

Referring initially to FIGS. 1 and 2, a metal spiral-wound gasket 10 is shown to have the form of a rounded annulus, or hoop, and includes a metal outer wrap or cover 12. An interior metal filler or core 14 is formed of a plurality of individual strips of Chevron-shaped metal windings 16.

Figure 3:
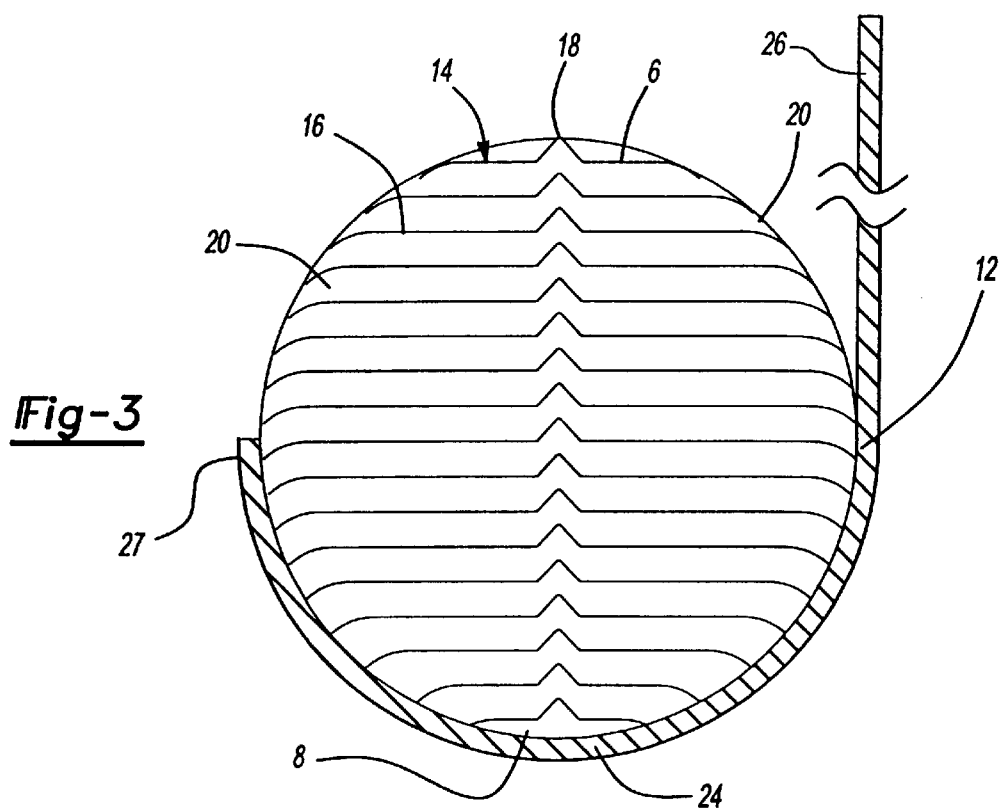
FIG. 3 is a view demonstrating the manner in which the gasket is constructed, particularly showing the core portion of the gasket partially installed, and prior to being fully wrapped by the outer cover portion.

Referring now particularly to FIG. 3, it will be appreciated by those skilled in the art of manufacturing spiral-wound gaskets that the V-notched undulations 18 of each strip 16 serve to impart a collective rigidity to the plurality of strips. In this particular preferred embodiment, the edges 20 of the layered individual strips 16 include a slight radius as shown to avoid stress cracks in a pre-formed resilient stainless steel core 14.

Also in the preferred embodiment of the subject invention, the individual strips employed to form the windings are preferably formed of a 304 stainless steel, which offers a spring steel quality as well as a resilience unparalleled by other types of stainless steel. The core 14 is pre-assembled to form a unitary composite having the noted shape of a circular hoop, with spot welds (not shown) provided intermittently along the circumferential outside diameter portion 6 of the core 14, as well as along the inside diameter portion 8 thereof, to assure integrity of the core 14.

A method of forming the gasket 10 is described in reference to FIG. 3. The composite core 14 is installed into the bottom or trough portion 24 of a J-shaped cover 12 during manufacture of the gasket 10. An upstanding portion 26 of the J-shaped cover 12 is wrapped about the exposed upper surface of the core 14 to form the O-shaped cross-sectioned cover 12 depicted in FIG. 2. In a preferred form, the upper extremity of the upstanding leg or portion 26 is wrapped over the opposed end 27 of the cover 12 to form an overlapped portion 22. The cover is preferably formed of a softer stainless steel material, such as SAE 301.

Although the preferred orientation of the collective V-notched undulations 18 of the Chevron-shaped metal windings 16 is as depicted in FIG. 2 for the described embodiment, other angular orientations may be suitable. The use of stainless steel, however, is strongly recommended for both core 14 and cover 12 in the present invention. Other metals, for example aluminum, are too soft for the high temperature, oxidation-prone environment of an exhaust manifold. Indeed, with respect to materials as soft as aluminum, there generally is no spring recovery available in the relevant heat range; hence plastic deformation of the gasket becomes a major issue.

Figure 4:
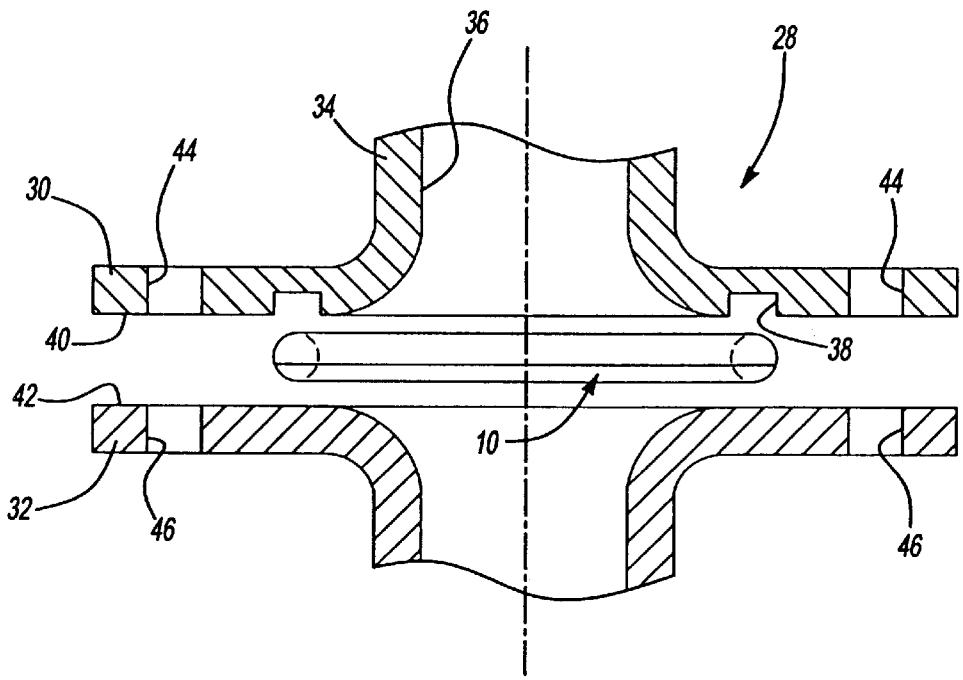
FIG. 4 is an exploded cross-section of an exhaust pipe assembly incorporating the same preferred embodiment of the spiral-wound gasket of this invention.

FIG. 4 depicts an exemplary application of the spiral-wound gasket 10 of the present invention. A pair of mating exhaust flanges 30 and 32 is affixed to an exhaust pipe 34 as, for example, in an exhaust manifold environment. The interior of the pipe 36 is suitable for the conveyance of hot gases having temperatures in a range of 1200° F. to 1500° F. The exhaust flange face 40 of the flange 30 contains a U-shaped or recessed groove 38 wherein the gasket may be installed prior to the mating of and the coupling of the flanges together via bolts (not shown) which pass through bolt apertures 44 and 46 for appropriate securement.

The groove 38 that accommodates the gasket 10 is preferred because the fully metallic gasket 10 has a relatively low incompressibility. Those skilled in the art will appreciate that appropriate dimensional tolerancing will be necessarily variable from application to application. However, one preferred dimension for the gasket for automotive passenger car use, as an example, includes a cross-sectional diameter of 4.5 mm. The depth of the groove 38 is approximately 4 mm, leaving a compressibility dimension of 0.5 mm. It will be noted that the flange face 42 of the flange 32 that mates with the exhaust flange face 40 is flat faced. Thus, for the dimensions set forth in the example, there is no need for a groove or recess to be carried in the flange face 42.

What is claimed is:

1. A spiral-wound gasket having a generally circular cross-section comprising:
   a plurality of tightly wound metal windings comprising a core of said gasket, said metal windings having a Chevron cross-section and being welded at edges thereof to define an integral circular hoop;
   said gasket further comprising a circumferential outer cover; wherein said outer cover also comprises a metal, and entirely covers said exterior surfaces of said core to incorporate an overlap of the ends of said outer cover.

2. The spiral-wound gasket of claim 1 wherein said core comprises a stainless steel material.

3. The spiral-wound gasket of claim 1 wherein said circumferential outer cover comprises a stainless steel material for oxidation resistance.

4. The spiral-wound gasket of claim 1 wherein both said core and said outer cover comprise stainless steel materials.

5. The spiral-wound gasket of claim 4 wherein said metal winding comprises SAE 304 stainless steel for hardness and spring characteristics.

6. The spiral-wound gasket of claim 5 wherein said outer cover comprises SAE 301 stainless steel to provide a relatively soft outer surface of said gasket.

7. The spiral-wound gasket of claim 6 wherein the combination of said outer cover and said core comprises a gasket, which retains resiliency in a temperature range of 1200° F. to 1500° F.

8. The spiral-wound gasket of claim 1 wherein said edges of said metal windings are slightly radiused.

9. A method of making a metallic spirally-wound gasket having a generally circular shaped cross-section comprising steps of:
   (a) spirally coiling together a plurality of strips of metal having a Chevron cross-section to form an annular core of said gasket,
   (b) welding the edges of said strips together whereby said core defines a pre-assembled unitary composite,
   (c) providing a second portion defining an annular outer cover having a J-shaped cross-section, and being sized to accommodate said annular core,
   (d) inserting said core into the trough of said J-shaped cross-section, wherein said upper portion of said core is exposed, and
   (e) wrapping the upstanding portion of said J-shaped outer cover about the exposed portion of said core to filly encapsulate said core, whereby said J-shaped outer cover becomes air O-shaped outer cover about said core.

10. The method of making a metallic spirally-wound gasket of claim 8 wherein said core comprises an SAE 304 stainless steel material.

11. The method of making a metallic spirally-wound gasket of claim 9 wherein said outer core comprises an SAE 301 stainless steel material, and has ends, one of which overlaps the other.

* * * * *

UNITED STATES PATENT AND TRADEMARK OFFICE
CERTIFICATE OF CORRECTION

PATENT NO.   : 6,517,086 B1
DATED         : February 11, 2003
INVENTOR(S)  : James I. Jamrog It is certified that error appears in the above-identified patent and that said Letters Patent is hereby corrected as shown below:

Title page,
Item [57], ABSTRACT,
Line 3, please delete "Chervon" and insert -- Chevron --,
Line 4, delete "registers" and insert -- register --.

Column 4,
Line 24, delete "filly" and insert -- fully --,
Line 26, delete "air" and insert -- an --.

Signed and Sealed this

Twenty-fourth Day of June, 2003

JAMES E. ROGAN
*Director of the United States Patent and Trademark Office*